United States Patent [19]

Menningen et al.

[11] 4,275,295

[45] Jun. 23, 1981

[54] LIMIT AND MEASUREMENT VALUE TRANSMITTER

[75] Inventors: Roland Menningen, Aarau; Kurt Ehrsam, Brugg; Jürg Oberhänsli; Kurt Grünig, both of Küttigen, all of Switzerland

[73] Assignee: Hectronic AG, Buchs, Switzerland

[21] Appl. No.: 41,915

[22] PCT Filed: May 23, 1979

[86] PCT No.: PCT/CH78/00023

§ 371 Date: May 23, 1979

§ 102(e) Date: May 23, 1979

[87] PCT Pub. No.: WO79/00179

PCT Pub. Date: Apr. 19, 1979

[30] Foreign Application Priority Data

Oct. 5, 1977 [CH] Switzerland ............... 12164/77

[51] Int. Cl.³ .............................................. G01D 5/34
[52] U.S. Cl. .................................... 250/227; 250/205
[58] Field of Search .......... 250/227, 226, 205, 231 R, 250/574, 577; 350/96.1, 96.24

[56] References Cited
U.S. PATENT DOCUMENTS 3,544,799  12/1970  Quinn .
3,882,887  5/1975  Rekai .

Primary Examiner—David C. Nelms
Assistant Examiner—Darwin R. Hostetter
Attorney, Agent, or Firm—Werner W. Kleeman

[57] ABSTRACT

In the measuring and control technics, indicators for a limit value and measurement value working for example on an optoelectronic basis are used to determine magnitudes of physical and chemical nature. For solving such problems, particularly in fields where there are risks of explosion, a reference light beam (20 to 23) is used in parallel to the measuring light beam (13,15 to 17) representing the magnitude measured. A difference signal (36) is obtained resulting from both light beams and representing the magnitude of the information. With this signal, indicators of universal use for limit value and measurement value can be built, working in a precise and reliable way, even in severe operating conditions, by using preferably light guides (15,17,21 to 23). With the use of flexible light guides (15,17,21 to 23) and of separate light transmitters (13,20) of different frequencies ($f_1, f_2$), and with an alternate operation of said light transmitters, etc., a wide field of application opens that will subsequently link to information processing.

9 Claims, 13 Drawing Figures

Fig. 10
Fig. 11
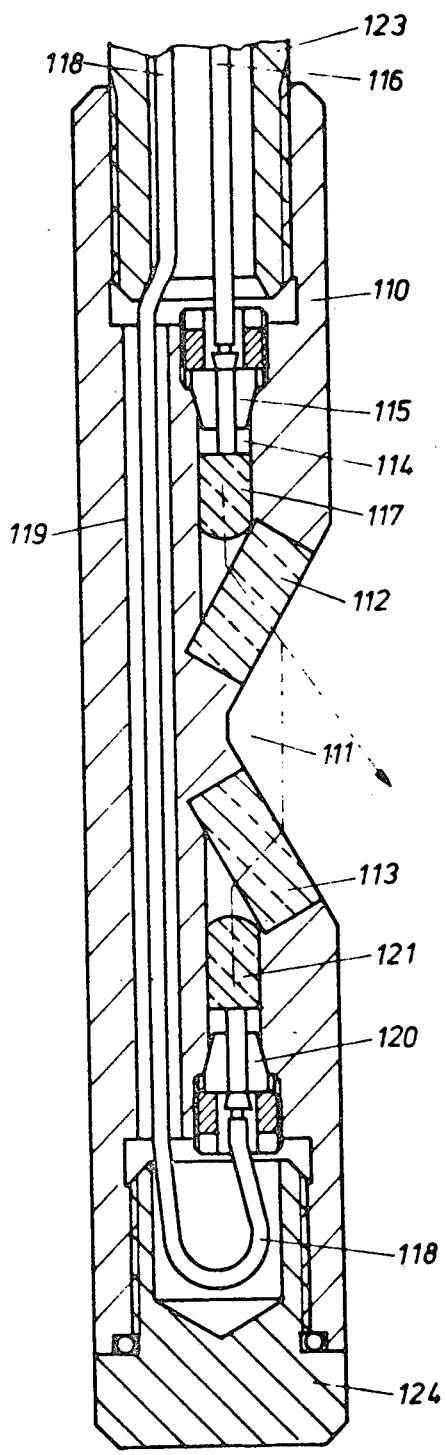
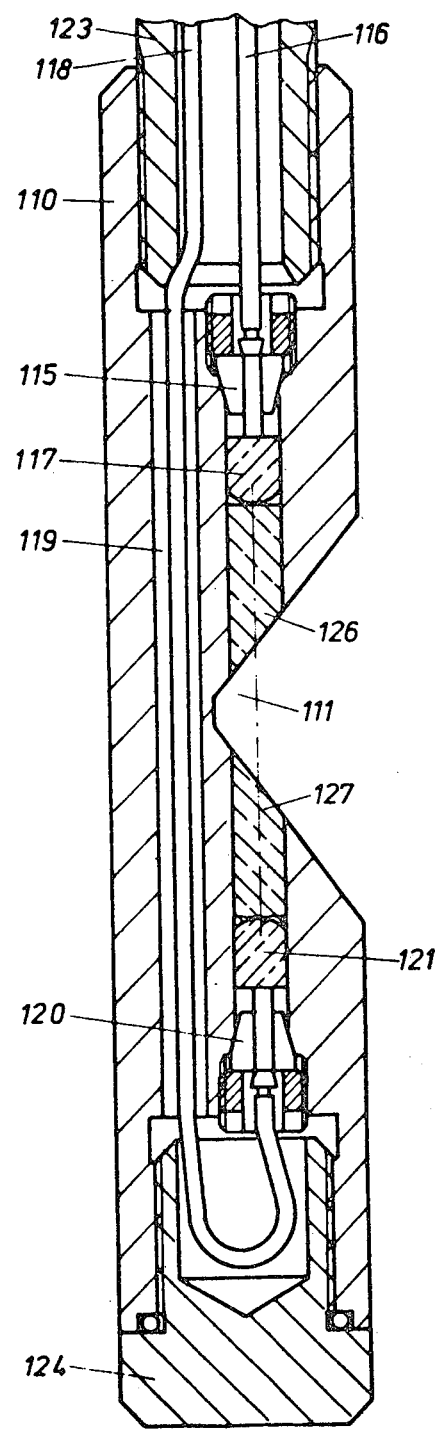

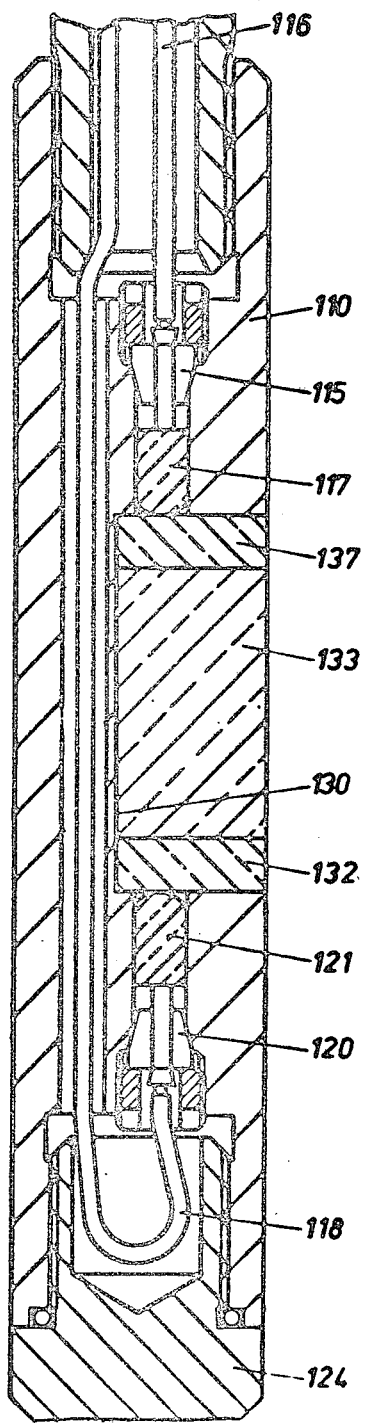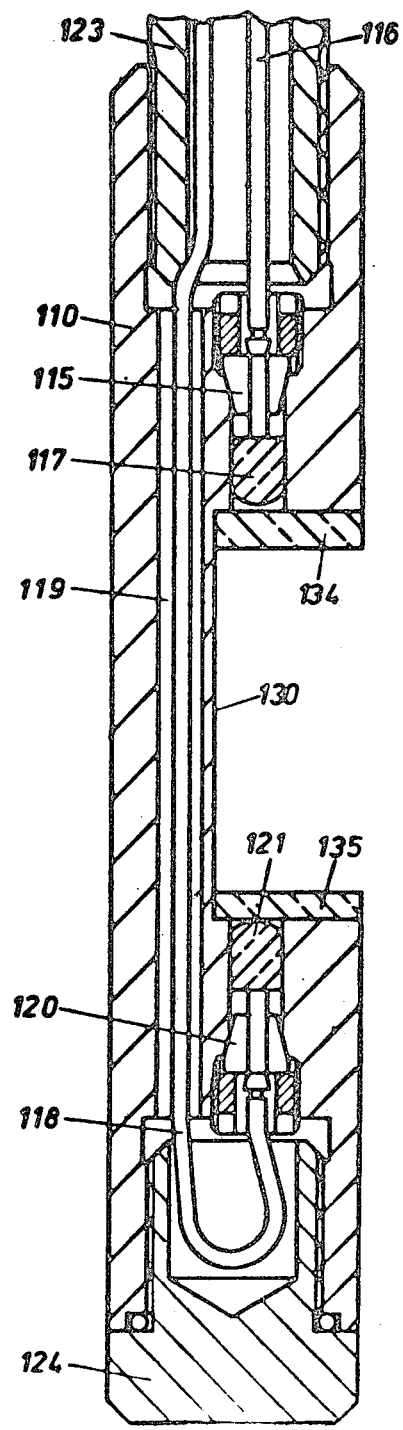

LIMIT AND MEASUREMENT VALUE TRANSMITTER

The present invention relates to a method of obtaining and transmitting signals which characterize a physical property of a substance which is to be monitored, in which method a measuring light current between a light transmitter and an optoelectrical light receiver is altered by means of a feeler transducer as a function of the physical property to be monitored, and there is derived from such measuring light current an appropriate electrical signal.

Furthermore, the invention relates to an apparatus for the performance of the method, comprising a light transmitter for producing a measuring light current, a feeler transducer for changing the measuring light current as a function of the physical property to be monitored, and an optoelectrical light receiver for receiving the measuring light current and for generating an appropriate electrical signal.

Methods and apparatuses of the aforementioned type are part of the state-of-the-art. With the known equipment the light transmitter, the light receiver and the feeler transducer are arranged relatively close to one another, and, as a general rule, united into a structural unit where the optical path of the measuring light current is relatively short. If the physical property to be monitored is, for instance, the level, that is to say, the degree of filling of a liquid in a tank, then electrical lines leading to the light transmitter and to the optoelectrical light receiver must be led into the tank. This requires special protective measures in the event that the liquid is easily combustible and the vapors of the liquid in conjunction with air can form an explosive mixture. Solutions are already known where the light transmitter and the photoelectric light receiver are arranged directly outside of the tank and the measuring light current is infed to and returned from the feeler transducer by means of rigid light guide rods. With these solutions there are permissible somewhat simpler protective measures as concerns fire and explosion danger, but the relevant apparatuses are tailored, in each case, specifically to a certain field of use, and therefore, cannot be employed for different purposes and in different situations.

Therefore it is the object of the present invention to provide a method and apparatus of the previously mentioned type, such that, on the one hand, the electrical light transmitter and the optoelectrical light receiver, and, on the other hand, the feeler transducer, are neither bound to a predetermined position in relation to one another nor to a fixed spacing from one another, thereby resulting in a heretofore unknown great accommodatability of the monitoring and transmission apparatus to the most different situations encountered in practice and, if desired, for reducing the danger of fire and explosion arranging the light transmitter and the light receiver at a relatively large spacing from the feeler transducer, and therefore, clearly outside of the danger zone, without impairment of the functional reliability of the equipment.

The method rendering possible the solution of this objective according to the invention is characterized by the features that, in addition to the measuring light current which can be altered by means of the feeler transmitter, there is produced a reference light current extending parallel thereto, however unaffected by the feeler transducer, that the difference between the electrical signal derived from the measuring light current and a second electrical signal derived from the reference light current is processed into an electrical information signal, and the measuring light current and the reference light current are infed to and outfed from the feeler transducer by light guides of one and the same light guide bundle.

The inventive apparatus for the performance of this method is characterized by the features that the measuring light current is infed from the light transmitter to the feeler transducer and delivered from the feeler transducer to the light receiver by mutually parallel light guides, that a reference light current which is unaffected by the feeler transducer is guided essentially parallel to the measuring light current likewise by means of light guides, that the light guides for the measuring light current and for the reference light current are part of one and the same light guide bundle, and that optoelectrical means are provided in order to derive a first electrical signal from the measuring light current and a second electrical signal from the reference light current, and further means are provided in order to compare the first and second electrical signals and to form from a difference of such signals an electrical information signal.

By means of the invention it is rendered possible to alter throughout wide limits the light guide bundles containing the light guides for the measuring light current and for the reference light current, for instance, to extend the same or to arrange such in a spatially different manner, without thereby impairing the functional relaibility of the equipment, or requiring special tuning work for its maintenance.

In order to continuously control correct functioning of the obtaining of and transmission of the signal, it is advantageous, according to a further construction of the invention, to periodically introduce a temporary change of one of the two light currents or the electrical signal derived therefrom, for the periodic simulation of a predetermined minium change of the physical property to be monitored, so that in each case there is produced an appropriate information signal which can be employed for indicating the correct functioning of the obtaining of the signal and signal transmission, respectively.

Further details and advantages of the invention will be seen from the claims, from the hereinafter given description and from the related drawings in which there are schematically shown exemplary embodiments of the invention.

FIG. 1 illustrates the circuit arrangement of a first exemplary embodiment of inventive apparatus for obtaining and transmitting signals;

FIG. 2 constitutes a number of graphs plotting current as a function of time or voltage as a function of time, respectively, and helpful for understanding the mode of operation of the circuit arrangement of FIG. 1;

FIG. 10 is a longitudinal sectional view through a feeler transducer for determining a maximum state of filling of a liquid;

FIG. 11 is an analogous longitudinal sectional view of a feeler transducer for determining a minimum degree of filling of a liquid;

FIG. 12 is an analogous longitudinal sectional view of a feeler transducer having an optically active crystal for determining temperature, mechanical pressure, magnetic field intensity or electrical field intensity, depending upon the nature of the optically active crystal provided for the feeler transducer;

FIG. 13 is an analogous longitudinal sectional view through a feeler transducer for determining the transparency of a substance which is at least partially light pervious or the presence or absence of a light impervious substance.

Figure 1:
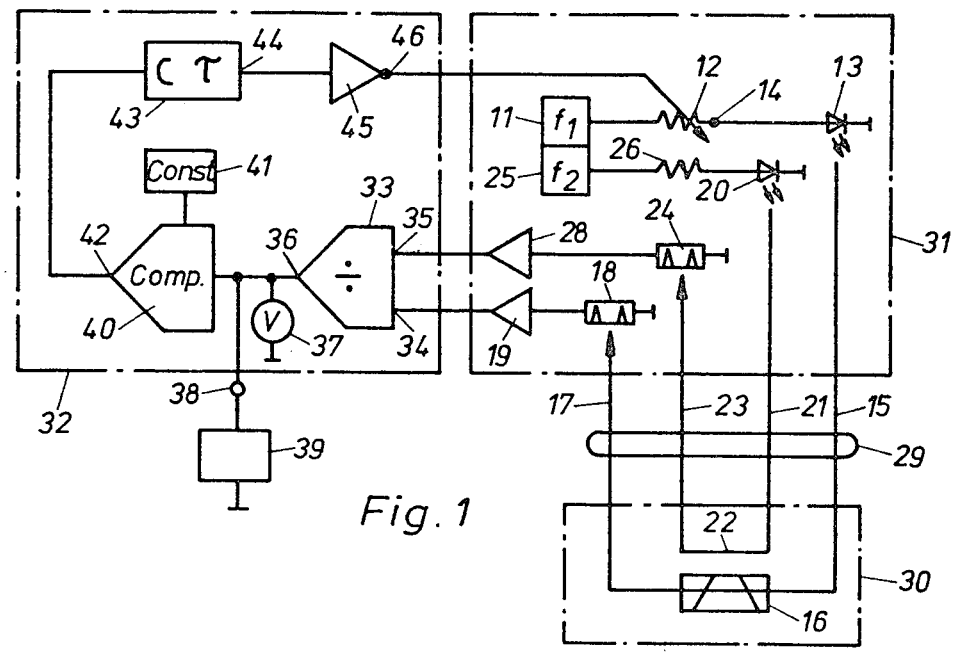

There will be initially considered in detail FIG. 1, wherein reference character 11 designates an oscillator for generating an alternating current having the frequency f1. The output of the oscillator 11 is connected by means of a controllable current regulator 12 with an electrically powered light source 13, which may be advantageously a light-emitting diode, and produces a pulsating light in cycle with the alternating current delivered by the oscillator 11, the intensity of which is proportional to the current intensity at the output 14 of the current regulator 12. The light current transmitted by a light source 13 is delivered by means of a first light guide 15 to an optically effective feeler transducer 15 which is capable of altering the light current as a function of a physical property of a substance which is to be monitored. The construction of the feeler transducer 16 will be discussed more fully hereinafter with reference to FIGS. 10 to 13. A second light guide 17 leads from the feeler transducer 16 to an optoelectrical light receiver 18 which generates a first electrical signal in accordance with the incident light current which is delivered by the light guide 17, which signal is amplified in an amplifier 19. The light current flowing through the light guides 15 and 17, emanating from the light source 13, received by the light receiver 18 and altered by means of the feeler transducer 16, will be referred to hereinafter as the measuring light current.

Arranged parallel to the described measuring light current is a reference light current which is guided from a second light source 20 through a light guide 21 at the direct neighbourhood of the feeler transducer 16, by means of a light bridge 22 past the feeler transducer 16 and by means of a further light guide 23 to an optoelectrical light receiver 24. In order to power the light source 20, which advantageously likewise is constituted by a light-emitting diode, there is provided a second oscillator 25 which produces an alternating current having the frequency f2, and the frequency f2 may be the same as the frequency f1 or different therefrom. Preferably the frequencies f1 and f2 are in the order of 10 kHz to 30 kHz. The output of the oscillator 25 is connected with the light source 20 by means of a current regulator 26, whose output 27 powers the light source 20 with a predetermined current intensity. The light receiver 24 produces a second electrical signal corresponding to the reference light current and amplified in an amplifier 28.

The four light guides 15, 17, 21 and 23 are components of a common light guide bundle or light guide cable 29 which is arranged, on the one hand, between a structural unit 30 containing the feeler transducer 16 and the light guide bridge 22 and, on the other hand, an apparatus unit 31 containing the remaining described components. Advantageously, plug connections are provided in order to releasably connect the light guide bundle or light guide cable 29 with the structural unit 30 and the apparatus unit 31, so that it is possible, whenever necessary, to incorporate an extension light guide bundle or light guide cable.

Light guides of the previously mentioned type are part of the state-of-the-art and therefore need not here be further described. It is only mentioned that each individual one of the light guides 15, 17, 21 and 23 either contains a single glass fibre, for instance, of about 0.5 mm diameter or a multiplicity of appreciably thinner glass fibres which collectively form a strand, the diameter of which likewise amounts to about 0.5 mm. In both cases a thin surface layer of the glass fibre or glass fibres ensures that the light flowing through the light guide will not laterally deviate. Each light guide furthermore has a protective sheath, formed for instance of tetrafluoroethylene. The above-mentioned light guide bundle or light guide cable 29 is prefereably flexible.

According to the showing of FIG. 1 the apparatus unit 31 is connected with a further apparatus unit 32. Such contains an analogue-divider circuit 33 having two inputs 34 and 35 each of which are connected with an output of the amplifiers 19 and 28. The output 36 of the divider circuit 33 delivers an electrical information signal proportional to the quotient of both voltages at the inputs 34 and 35 and visually displayed by means of a display instrument 37. There is also connected with the output 36 of the divider circuit 33 a connection terminal 38 for connecting an external optical or accoustical signal transmitter 39, which is advantageously constructed such that it responds when the electrical information signal appearing at the output 36 deviates by more than a predetermined amount from a normal value, for instance exceeds a predetermined threshold value.

There is also connected with the output 36 of the divider circuit 33 an input of a voltage comparator 40, which furthermore is connected with a constant reference voltage source 41. The output 42 of the comparator 40 is connected with a time-delay element 43, at the output 44 of which there is connected an inverter 45. The output 46 of the inverter 45 delivers a control voltage for controlling the current regulator 12.

The manner of using and mode of operation of the described apparatus is as follows:

It is assumed that the feeler transducer 16 constitutes a liquid probe which appreciably attenuates or completely interrupts the measuring light current when it immerses into the liquid. As long as the liquid level is located below the feeler transducer 16, then, the measuring light current practically completely impinges at the light receiver 18, whereas at the same time the reference light current arrives at the light receiver 24. The current regulators 12 and 26 are set in a manner such that their outputs 14 and 27, respectively, deliver practically the same alternating current intensity to the light sources 13 and 20 and thus, the measuring light current and the reference light current have the same intensity. Consequently, the electrical signals infed to the two inputs 34 and 35 of the analogue-divider circuit 33 are practically of the same magnitude, wherefore there appears at the output 36 of the divider circuit 33 an information signal corresponding to the quotient 1 which can be read at the display instrument 37.

When the feeler transducer 16 is contacted by the liquid, i.e. when the degree of filling of the liquid has reached an upper boundary or threshold, then the measuring light current is altered in that, it is completely or at least partially deflected in a manner such that the light intensity in the light guide 17 and at the light receiver 18 is appreciably attenuated or practically assumes the value null, as will be described hereinafter with reference to FIG. 10. As a consequence thereof the electrical signal at one input 34 of the analogue-divider circuit 33 drops, whereas, at the same time, the electrical signal at the other input 35 remains constant. Hence, there changes the quotient of both aforementioned electrical signals and the information signal, proportional to such quotient, appearing at the output 36 of the divider circuit 33. In the present case it is assumed that the aforementioned quotient becomes smaller than 1, and thus, the information signal drops, i.e., practically becomes null. The reduction of the information signal is visually displayed by the display instrument 37. At the same time the external signal transmitter 39 responds and delivers an alarm. The information signal advantageously can also simultaneously be employed for automatically controlling a shutoff valve or the like, by means of which it is possible to interrupt the further inflow of liquid.

When the level of the liquid has dropped to such an extent that the feeler transducer 16 no longer is immersed therein i.e. contacted therewith, then, it is possible for the measuring light current to again completely reach the light receiver 18, and thus, the original conditions are again reestablished.

Figure 2:
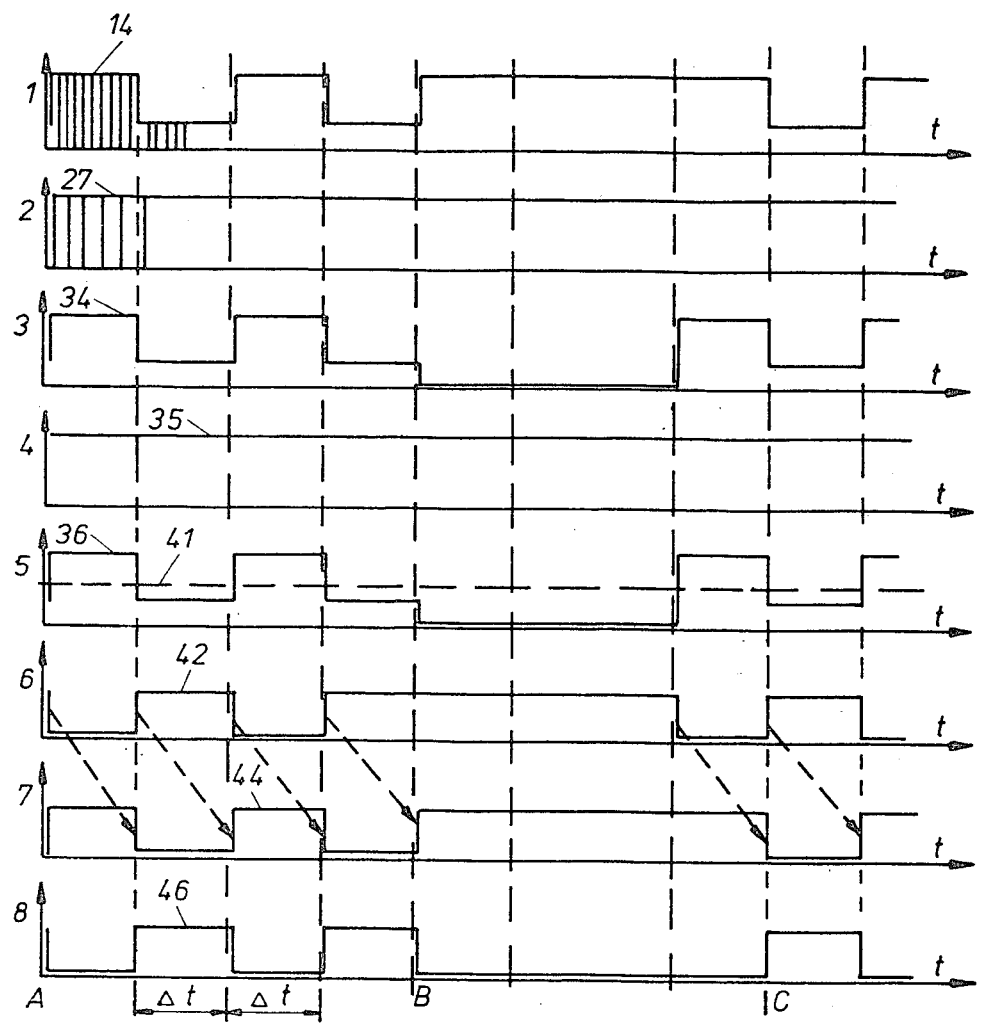

For the further explanation of the mode of operation reference is made to FIG. 2 where there has been illustrated the course as a function of time of different electrical currents and voltages. To improve the clarity of illustration the individual graphs of FIG. 2 have been designated with the same reference characters as employed for the corresponding inputs or outputs of FIG. 1 at which there appeal the relevant currents or voltages.

In order that the functional reliability of the apparatus can be continuously monitored, the measuring light current is periodically temporarily somewhat reduced, in order to simulate a predetermined minimum change which can be brought about by the feeler transducer 16. The periodic temporary reduction of the measuring light current is accomplished by appropriately controlling the current regulator 12, so that the alternating current serving for powering the light source 13 and appearing at the output 14 of the current regulator 12 has the course, during the time interval A-B, as illustrated in the uppermost graph of FIG. 2. The intensity of the measuring light current transmitted by the light source 13 is proportional to the envelope curve of the alternating current course at point 14. In the second graph of FIG. 2 there has been plotted the alternating current which is constant as a function of time, at the output 27 of the current regulator 26. Hence, the intensity of the reference light current transmitted by the light source 20 is constant. The reduction of the intensity of the measuring light current, periodically brought about in the described manner, is clearly less than the above explained reduction arising in the event of overflow of the feeler transducer 16 by the liquid. In the third and fourth graphs of FIG. 2 there have been respectively plotted the electrical signals at the input 34 and the input 35 of the analogue-divider circuit 33. It will be seen that the electrical signals are proportional to the intensity of the measuring light current and the reference light current as long as there is considered the time interval A-B. The fifth graph of FIG. 2 shows the course as a function of time of the electrical information signal appearing at the outputs 36 of the divider circuit 33, which is visually displayed by means of the display instrument 37. However, the periodic changes of the information signal do not have any influence upon the signal transmitter 39, since these changes are too small in order to cause a response of such signal transmitter.

In the comparator 40 there is continuously compared the information signal appearing at the output 36 of the divider-circuit 33 with a constant reference voltage emanating from the source 41. As long as the information signal exceeds the reference voltage of the source 41 no voltage is present at the output 42 of the comparator 40. If the information signal drops below the reference potential from the source 41, then there appears a direct-current voltage at the output 42 of the comparator 40, which has been illustrated in the sixth graph of FIG. 2. This direct-current voltage is infed by means of the time-delay element 43, delayed by the time interval $\Delta t$, to the inverter 45. In the seventh graph of FIG. 2 there is plotted the time-delayed direct-current voltage which appears at the output 44 of the time-delay element 43. At the output 46 of the inverter 45 there always then appears a direct-current voltage, when the output 44 of the time-delay element 43 does not carry any potential, this direct-current voltage being infed as a control voltage to the current regulator 12 and has been plotted in the eighth graph of FIG. 2. The aforementioned control voltage, in each case, causes the above-explained reduction of the alternating-current (cf. first graph FIG. 2) serving to power the light source 13. The described procedures automatically periodically repeat, and the periods are determined by the time delay $\Delta t$ in the time-delay element 43. The time delay $\Delta t$ can be advantageously selected to be between 1/10th second and a number of seconds. In each case it amounts to a multiple of an oscillation period of the oscillators 11 and 25.

If, for instance, at the time point B the feeler transducer 16 is fully submerged in the liquid, then the information signal appearing at the output of the divider circuit 33 drops practically to null, as has been explained above, and the output 42 of the comparator 40 delivers a direct-current voltage which is maintained for such length of time as the feeler transducer 16 is flooded with liquid. During the aforementioned direct-current voltage, the control voltage appearing at the output 46 of the inverter 45 is equal to null, so that the light source 13 is powered with the full current intensity. Only after the feeler transducer 16 emerges at the point in time C from the liquid does the information signal at the output 36 of the divider circuit 33 again assume the normal value corresponding to the quotient 1, whereafter there automatically is again initiated the periodic checking of the equipment by periodically temporarily reducing the supply current of the light source 13.

Figure 3:
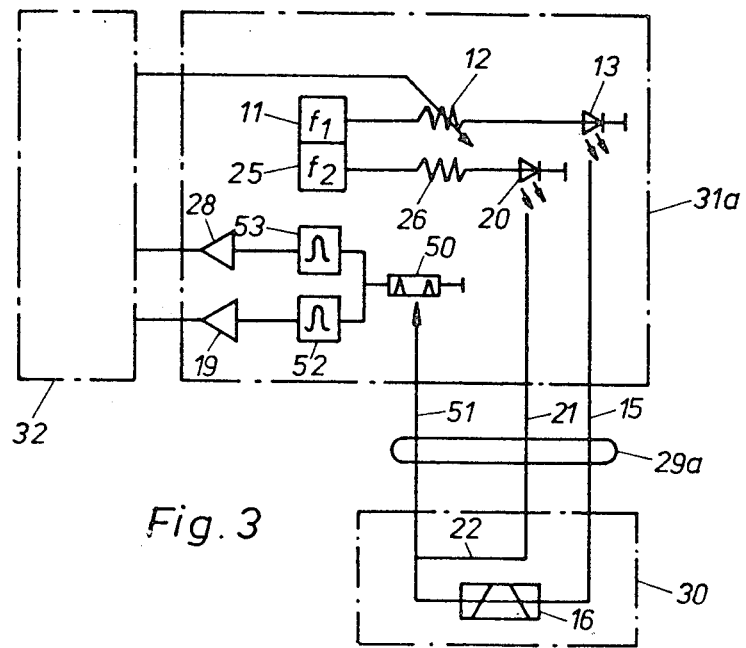
FIG. 3 illustrates a variant embodiment of part of the circuitry of FIG. 1.

In FIG. 3 there is shown a modified embodiment of the circuit arrangement of FIG. 1. The apparatus unit 32 is not changed in relation to that of FIG. 1, and therefore, has been only illustrated by a block. Instead of the apparatus unit 31 as shown in FIG. 1, here there is employed a somewhat altered apparatus unit 31a, wherein the primary difference resides in the fact that instead of the two light receivers 18 and 24 here there is only provided a single light receiver 50, to which both the measuring light current and also the reference light current are infed by a light guide 51 which is common to both light currents. The electrical ouput of the light receiver 50 is connected by means of a first bandpass filter 52, tuned to the frequency f1 of the oscillator 11, with the input of the amplifier 19 and by means of a second bandpass filter 53, tuned to the frequency f2 of the oscillator 25 differing from the frequency f1, with the input of the amplifier 28. The light guide bundle or light guide cable 29a between the apparatus unit 31a and the structural unit 30, in this case, only has three parallel extending light guides. In the structural unit 30 both the optical output of the feeler transducer 16 as well as also the light guide bridge 22 are optically conductively connected with the light guide 51.

The use and mode of operation of the exemplary embodiment of FIG. 3 is basically like that of the equipment of FIG. 1, with the single exception that both the measuring light current and also the reference light current are guided through the common light guide 51 and the separation of the electrical signals derived from both light currents is accomplished with the aid of the two bandpass filters 52 and 53 at the output of the common optoelectrical light receiver 50.

Figure 4:
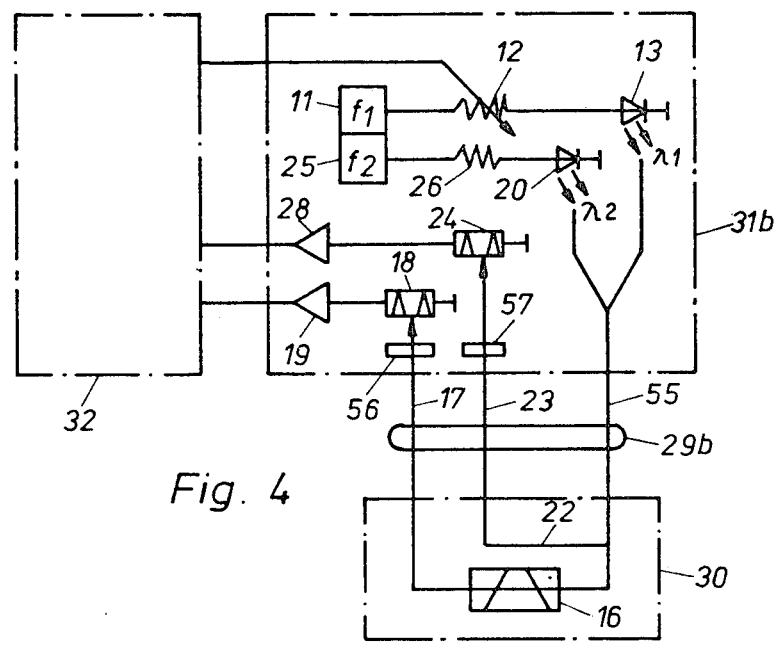
FIG. 4 illustrates again a variant embodiment of part of the circuitry of FIG. 1.

A different embodiment of apparatus, from that shown in FIG. 1, has been illustrated in FIG. 4, where again the apparatus unit 32 has simply been portrayed as a block since it completely coincides with the unit 32 of FIG. 1 discussed above. The other apparatus unit 31b differs from the corresponding unit 31 of the arrangement of FIG. 1 primarily by the features that two light sources 13 and 20 propagate light having different wave lengths λ1 and λ2, for instance, so that there are formed a red measuring light current and a green reference light current. Both of these light currents are combined by means of the light guides 15a and 21a and are infed by a common light guide 55 to the feeler transducer 16 and the light guide bridge 22. The optoelectrical light receiver 18 has arranged forwardly thereof a light filter 56 which only passes the light rays transmitted by the measuring light source 13, however, is impervious for the light rays transmitted by the reference light source 20. In analogous manner there is connected forwardly of the other light receiver 24 a light filter 57 which only passes the light rays transmitted by the reference light source 20, however, is impervious for the light rays of the measuring light source 13. It should be apparent that with this embodiment the light guide bundle or light guide cable 29b has only three parallel extending light guides 17, 23 and 55 between the apparatus unit 31b and the structural unit 30, of which the light guide 55 is common to the measuring light current and the reference light current. The mode of operation of this embodiment of FIG. 4 is basically like that of the circuit arrangement of FIG. 1.

Figure 5:
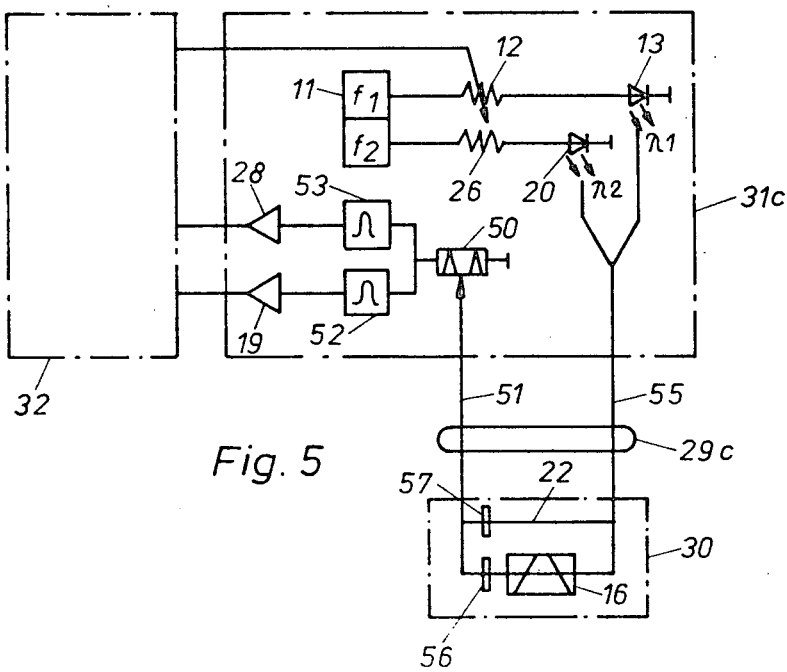
FIG. 5 illustrates still another variant embodiment of the circuitry of FIG. 1.

In FIG. 5 there is shown a third modification of the arrangement of FIG. 1. The apparatus unit 32 has only been shown as a block since it corresponds to the corresponding structure of FIG. 1 in all respects. The other apparatus unit 31c contains a combination of the embodiments portrayed in FIGS. 3 and 4. Both of the light sources 13 and 20 are designed to transmit light having different wave lengths λ1 and λ2, and the light currents transmitted by both of the light sources 13 and 20 are combined by means of the light guides 15a and 21a and infed to a common light guide 55. There is provided a single optoelectrical light receiver 50 to which leads a light guide 51 which is common to the measuring light current and the reference light current. The electrical output of the light receiver is connected by means of a first bandpass filter 52, tuned to the frequency f1 of the oscillator 11, with the input of the amplifier 19 and by means of a second bandpass filter 53, tuned to the frequency f2 of the oscillator 25, with the input of the amplifier 28. In this case the light guide bundle or light guide cable 29c arranged between the apparatus unit 31c and the structural unit 30 only has two parallel extending light guides 51 and 55. Within the structural unit 30 there is branched the light guide 55 and leads both to the feeler transducer 16 as well as also to the light guide bridge 22. The feeler transducer 16 has operatively associated therewith a light filter 56 which only passes light emanating from the measuring light source 13. In analogous manner there is connected in the light guide bridge 22 a light filter 57 which only passes light emanating from the reference light source 20. The light guide 51 is connected both with the optical output of the feeler transducer 16 as well as also with the light guide bridge 22.

The mode of operation of the embodiment of FIG. 5 is basically like that described in conjunction with FIG. 1. The measuring light current and the reference light current are in part conjointly guided through the light guides 55 and 51. Furthermore, the electrical signal infed to the amplifier 19 exclusively corresponds to the intensity of the measuring light current, whereas the electrical signal infed to the amplifier 28 exclusively correponds to the intensity of the reference light current.

Figure 6:
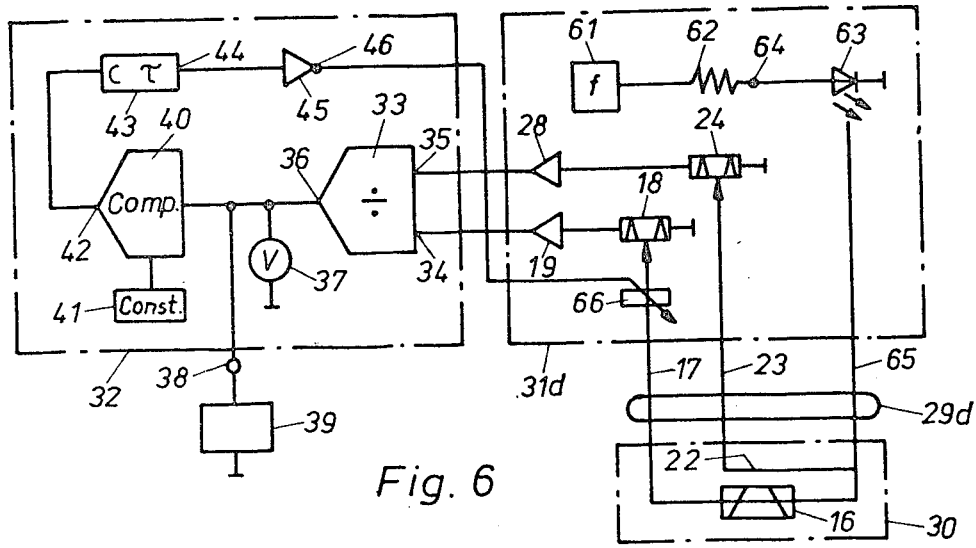
FIG. 6 is a circuit diagram of still a second exemplary embodiment of apparatus.

A further exemplary embodiment of the inventive apparatus has been schematically shown in FIG. 6. In a first apparatus unit 31d there is present a single oscillator 61 for generating an alternating current of the frequency f. By means of this alternating current there is powered a single light source 63 via a current regulator 62 in order to generate the measuring light current and the reference light current. Both of these light currents are conducted through a common light guide 65 both to the feeler transducer 16 and the light guide bridge 22, both of which are located in the structural unit 30. Instead of using the common light guide 65 it would be equally also possible to use two separate light guides (not shown). A light guide 17 leads from the optical output of the feeler transducer 16 to a first optoelectrical light receiver 18 in the apparatus unit 31d. This light receiver 18 is connected to the input of an amplifier 19. Located between the light guide 17 and the light receiver 18 is an electrooptical filter 66, the light permeability of which can be controlled by an electrical control voltage. The filter 66 is, for instance, a liquid crystal. Leading from the optical output of the light guide bridge 22 is a light guide 23 to a second optoelectrical light receiver 24 which is connected with the input of the amplifier 28. The light guides 17, 23 and 65 constitute components of one and the same light guide bundle or light guide cable 29d.

Located in a second apparatus unit 32 are the same components and the same circuitry as in the apparatus unit 32 of FIG. 1 likewise designated by reference character 32, so that there is here not needed any detailed discussion. The potential appearing at the output 46 of the inverter 45 is infed as a control voltage to the electrooptical filter 66.

The mode of operation of the apparatus shown in FIG. 6 is essentially as follows:

The alternating current produced by the oscillator 61 and infed to the light source 63 is stabilized by means of the current regulator 62, so that at the output 64 of the current regulator 62 there flows a constant current and the light source 63 has a constant light emission. In the first graph of FIG. 7 there has been plotted the constant current which appears at the output 64 of the current regulator 62. By means of the light guide 65 part of the light transmitted by the light source 63 is infed to the feeler transducer 16 and from the latter, when it is not immersed in a liquid, delivered via the light guide 17 and the filter 66 to the light receiver 18. One is here concerned with the measuring light current. A different part of the light emanating from the light source 63 is infed by means of the light guide 65 to the light guide bridge 22, through the latter to the feeler transducer 16 and past the same, and finally, infed via the light guide 23 to the light receiver 24. In this case one is concerned with the reference light current. The amplifier 19 delivers at the one input 34 of the analogue-divider circuit 33 a first electrical signal which corresponds to the intensity of the measuring light current incident at the light receiver 18.

Figure 7:
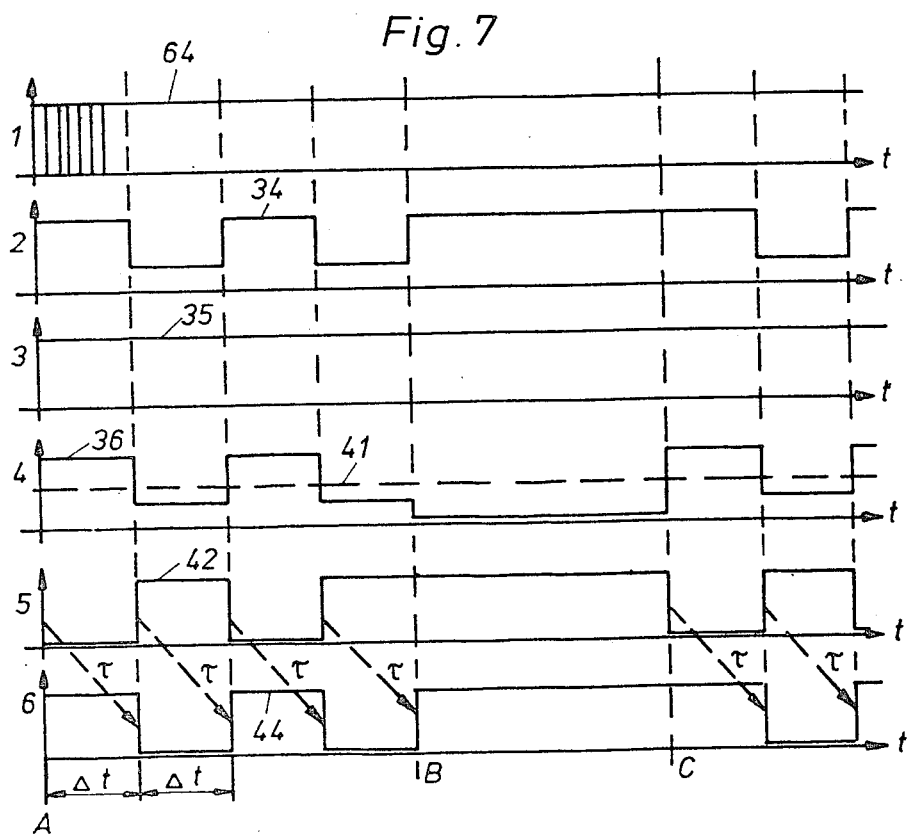
FIG. 7 illustrates a number of graphs, plotting current as a function of time or voltage as a function of time, respectively, for facilitating the understanding of the mode of operation of the circuit arrangement of FIG. 6.

With the aid of the electrooptical filter 66 the measuring light current is periodically momentarily attenuated in a manner to be described more fully hereinafter, so that the first electrical signal delivered at the one input 34 of the divider circuit 33 assumes the course shown in the second graph of FIG. 7 during the time span A-B. In contrast hereto the reference light current infed to the light receiver 24 remains constant in intensity, so that at the second input 35 of the divider 33 there appears a constant electrical signal, as such has been illustrated by the third graph of FIG. 7. At the output 36 of the divider circuit 33 there appears an electrical information signal which is proportional to the quotient of both signals at the inputs 34 and 35, the course of which has been illustrated in the fourth graph of FIG. 7. In the comparator 40 the mentioned information signal is continuously compared with a constant reference voltage from the source 41, and at the output 42 of the comparator there always then appears a direct-current voltage when the information signal is smaller than the constant reference potential. On the other hand, the potential at the output 42 of the comparator is equal to null when the information signal exceeds the constant reference voltage. In the fifth graph of FIG. 7 there has been plotted the course as a function of time of the output voltage of the comparator 40. This output voltage is delayed in the time delay element by a predetermined time span Δt, so that at the output 44 of the time delay element 43 there results the voltage course illustrated by the sixth graph of FIG. 7. At the output 46 of the inverter 45 there appears the voltage as plotted in the seventh graph of FIG. 7, which is infed as a control voltage to the electrooptical filter 66, whereby there is caused the aforementioned periodic temporary attenuation of the measuring light current incident at the light receiver 18. By means of the display instrument 37 there is indicated the correct functioning of the equipment.

If at time B the feeler transducer 16 is flooded by the liquid, i.e., when the state of filling of the liquid has reached a predetermined level, then the light current arriving at the feeler transducer 16 is deflected, so that practically no light arrives any longer at the feeler 18 and the electrical signal at the input 34 of the divider circuit 33 is extremely markedly reduced or practically equal to null. This causes a corresponding reduction of the information signal at the ouput 36 of the divider circuit, so that the signal or alarm transmitter 39 is placed into operation and, if necessary, there can be automatically actuated a shutoff valve or the like, in order to prevent any further inflow of liquid. As long as the feeler transducer 16 is flooded, then the output 46 of the inverter 45 is not under potential and the electrooptical filter 66 is controlled to its maximum transparency. As soon as the feeler transducer 16, at the time C, emerges from the liquid, then again the entire measuring light current arrives at the light receiver 18, whereafter the above-described operation of the periodic temporary weakening of the measuring light current is accomplished by means of the electrooptical filter 66.

Figure 8:
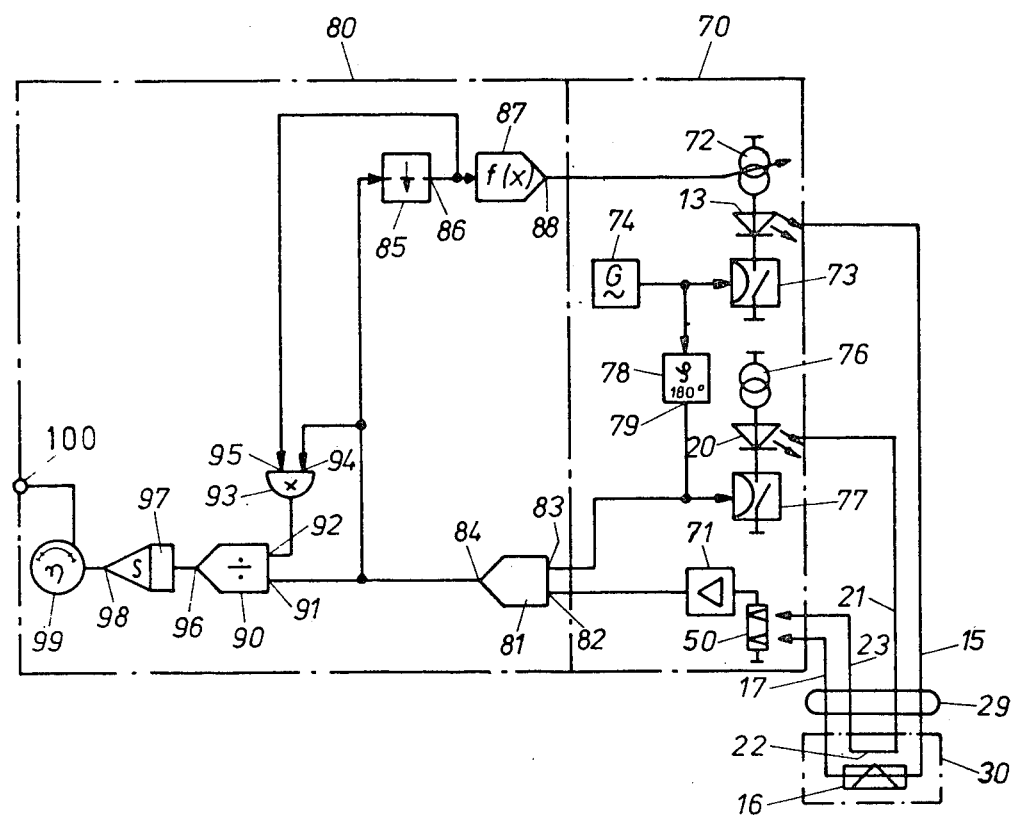
FIG. 8 is a circuit arrangement of a third exemplary embodiment of apparatus.

In FIG. 8 there is shown a further embodiment of the inventive apparatus in schematic view. In a first apparatus unit 70 there are located two light sources 13 and 20, for instance light-emitting diodes, for generating a measuring light current and a reference light current. The measuring light current is propagated from the light source 13 through a light guide 15 to the feeler transducer 16 and from that location is delivered by means of a light guide 17 to an optoelectric light receiver 50, which is arranged together with an associated amplifier 71 in the apparatus unit 70. The reference light current is conducted by means of a light guide 21 from the light source 20 to a light guide bridge 22 which leads past and adjacent the feeler transducer 16, and from that location is conducted by means of a light guide 23 likewise to the light receiver 50. The feeler transducer 16 and the light guide bridge 22 are located in a structural unit 30 which is spatially separately arranged from the apparatus unit 30 and together therewith is only connnected by the light guides 15, 17, 21 and 23. These light guides 15, 17, 21 and 23 extend parallel to one another and are components of one and the same light guide bundle or light guide cable 29 which is connected advantageously by a releasable plug connector with the apparatus unit 70 and the unit 30.

The light source 13 for the measuring light current is connected, for powering the same, with an electrical current source 72 which is variable by means of an electrical control voltage. In the supply current circuit of the light source 13 there is arranged an electronic switch 73, by means of which it is possible to turn-on and turn-off the light source 13. A clock generator 74 delivers, at its output 75, a regular sequence of electrical clock pulses for controlling the electronic switch 73 by means of which there is periodically turned-on and turned-off the light source 13. For powering the other light source 20 for the reference light current there is provided a constant current source 76. There is also arranged in the supply current circuit of the light source 20 an electronic switch 77. The output 75 of the generator 74 is connected with a phase reversal element 78, at whose output 79 there appear a regular sequence of clock pulses for controlling the electronic switch 77. Since the pulses for controlling both switches 73 and 77 are shifted by 180°, the light sources 13 and 20 are alternately turned-on and turn-off.

Now in a further apparatus unit 80 there is provided a phase reversal detector 81 having two inputs 82 and 83. The one input 82 is connected with the output of the amplifier 71, whereas the other input 83 is connected with the output of the phase reversal element 78. The phase reversal detector 81 furthermore has an output 84 at which there appears an information signal formed from both signals appearing at the inputs 82 and 83, as will be explained further hereinafter. Connected with the output 84 of the phase reversal detector 81 is a monoflop 85, the output 86 of which delivers a direct-current voltage pulse of predetermined duration when the information signal from the phase reversal detector 81 has a rising edge. The aforementioned direct-current voltage pulse appearing at the output 86 of the monoflop 85 controls a function generator 87, at the output of which there appears an electrical control voltage for altering the current intensity of the current source 72.

The apparatus unit 80 contains furthermore a divider circuit 90 having two inputs 91 and 92, of which the one input 91 is connected with the output 84 of the phase reversal detector 81. At the other input 92 of the divider circuit 90 there is connected the output of a logic linking circuit 93, which, in turn, has two inputs 94 and 95. The one input 94 is connected with the output 84 of the phase reversal detector 81 and the other input 95 is connected with the output 86 of the monoflop 85. The output 96 of the divider circuit 90 is connected with an integrating circuit 97, whose output 98 delivers an electrical signal to a display instrument 99 having threshold switching contacts. The switching contact for the upper threshold or boundary is connected with a connection terminal 100 for connecting an external (not shown) signal or alarm transmitter.

In order to explain the mode of operation of the apparatus described in conjunction with FIG. 8 reference will now be made also to the illustration of FIG. 9 where there have been shown different pulse graphs. In order to more readily understand the following explanations the pulse graphs of FIG. 9 have been indicated with the same reference characters as the corresponding outputs and inputs at which these pulses appear in the circuitry of FIG. 8. The first graph of FIG. 9 portrays the course as a function of time of the clock pulses appearing at the output 75 of the generator 74, whereas the second graph plots the course as a function of time of the clock pulses appearing at the output 79 of the phase reversal element 78. It will be seen that the pulses of the second graph always are situated exactly at the pulse intervals between the pulses of the first graph. The frequency of the clock pulses is in the order of, for instance, between 10 kHz and 100 kHz.

Figure 9:
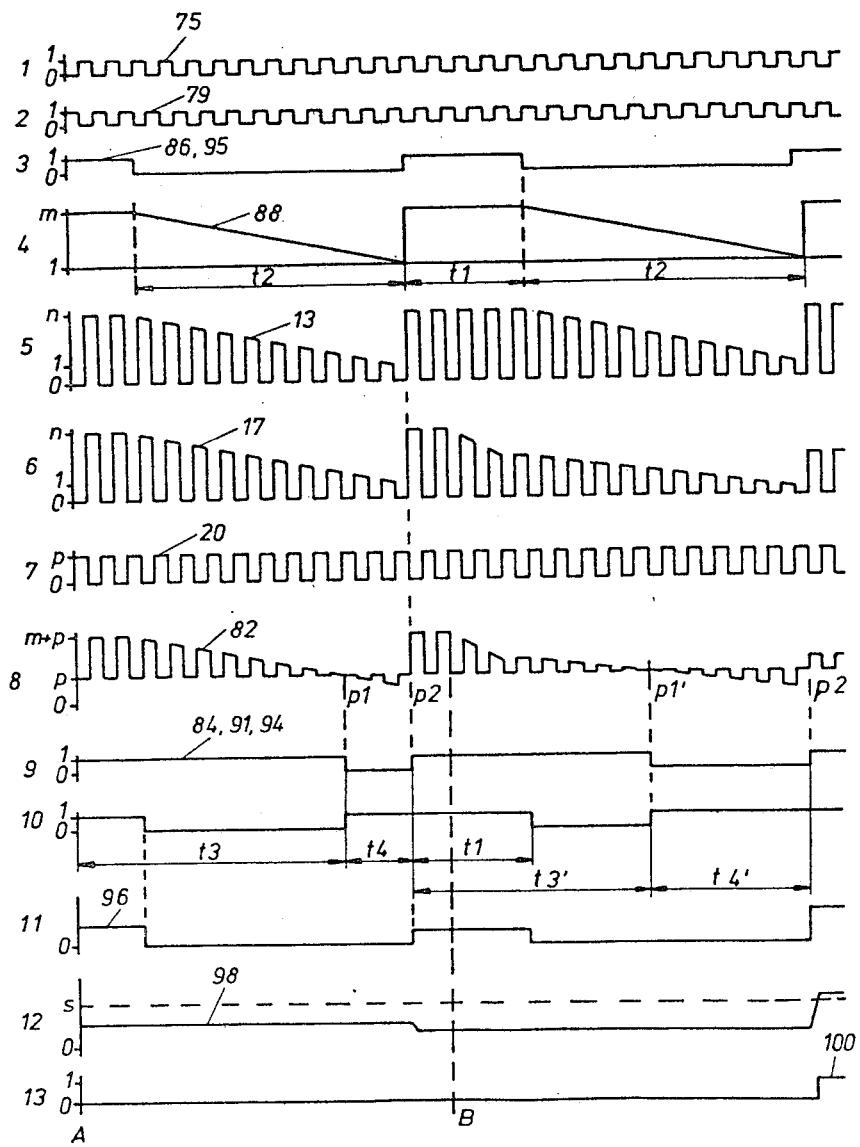
FIG. 9 illustrates a number of graphs, plotting current as a function of time or voltage as a function of time, respectively, for facilitating the mode of operation of the circuitry of FIG. 8.

The third graph of FIG. 9 shows the course of the control pulses appearing at the output 86 of the monoflop 85 for controlling the function generator 87, whereas the fourth graph illustrates the output potential of the function generator 87. In each case during the time duration $t_1$ of a control pulse delivered by the monoflop 85 the output voltage of the function generator 87 remains constant at a maximum value. At the end of one of each such control pulses the output potential of the function generator 87 continuously decreases, and specifically, during a predetermined time duration $t_2$, whereafter the output potential automatically again returns to its original maximum value. The output potential of the function generator 87 controls the current intensity of the current source 72, and thus, also the light intensity of the light source 13 for the measuring light current. As a result, the current intensity of the light source 72 varies in accordance with the output potential of the function generator 87 (graph 4), whereas, the current intensity of the current source 76 remains constant. By means of the electronic switch 73 the light source 13 for the measuring light current is periodically switched-on and switched-off as a function of the clock pulses of the generator 74 (graph 1). As a result, the light source 13 transmits measuring light current pulses according to the fifth graph of FIG. 9. By means of the electronic switch 77 the measuring light source 20 for the reference light current is periodically switched-on and switched-off as a function of the clock pulses appearing at the output 79 of the phase reversal element 78, and thus the light source 20 transmits reference light current pulses according to the graph 7 of FIG. 9.

As long as the feeler transducer 16 thus has transparency, e.g., is not contacted by a liquid, the light currents transmitted by the light sources 13 and 20 are delivered practically without any attenuation to the optoelectrical light receiver 50. The electrical signal which is produced by the light receiver 50 and amplified in the amplifier 71 corresponds, therefore, to a superposing of the measuring light pulses and the reference light pulses. The resultant electrical signal delivered at the input 82 of the phase reversal detector 81 is shown in the graph 8 of FIG. 9. It will be seen that this clocked signal experiences a phase reversal at the time P1, namely then when the intensity of the light pulses of the measuring light current is equal to the intensity of the light pulses of the reference light current. At the moment of this phase reversal the potential state appearing at the output 84 of the phase reversal detector 81 changes from "high" to null. If at the time P2 the control voltage at the output 88 of the function generator 87 jumps from its minimum value to the maximum value, then the signal at the input 82 of the phase reversal detector 81 again experiences a phase reversal in the opposite sense, so that the potential state at the output 84 of the detector 81 changes from null to "high", and the monoflop 85 is triggered and there is delivered at its output 86 a direct-current pulse according to the showing of the graph of FIG. 9 to the function generator 87, whereafter the work cycle of the function generator 87 repeats, and the period amounts to 0.1 to 10 seconds.

If the transparency of the feeler transducer 16 is reduced, for instance due to immersion into a liquid, then of course the intensity of the measuring light current infed to the light receiver 50 by the light guide 70 accordingly decreases. This has been illustrated by the graph 6 of FIG. 9, where it will be apparent that starting from the time B the amplitudes of the light pulses in the light guide 17 are reduced in relation to the time interval before the time B. This reduction of the intensity of the measuring light current has the result that the next following phase reversal at the input 82 of the phase reversal detector 81 occurs at an earlier point of time P1' than with the unattenuated measuring light current. The forward shifting as a function of time of the phase reversal time point P1' in relation to the time point P' constitutes a measure of the reduction of the transparency of the feeler transducer 16. This measure is evaluated with the aid of the divider circuit 90 and the logical coupling element 93. Due to the timewise forward shift of the phase reversal time point P1' there is altered the relationship of the pulse duration t3 to the pulse pause or interval t4 of the potential at the output 84 of the phase reversal detector 81, i.e., the pulse duration is decreased to t3' and the pulse pause is increased to t4', as shown by the graph 9 of FIG. 9. In the divider circuit 90 there is formed the quotient from the voltage pulses delivered from the output 84 of the phase reversal detector 81 to the input 91 and the voltage pulses delivered from the logic coupling element 93 to the second input 92, according to the graph 10 of FIG. 9, which, in turn, are formed from the output pulses of the monoflop 85 (graph 3 of FIG. 3) and the pulse intervals of the output signal from the phase reversal detector 81 (graph 9). At the output 96 of the divider circuit 90 there appears the signal, illustrated in the graph 11 of FIG. 9, in the form of voltage pulses, the duration of which in each case coincides with the duration t1 of the monoflop pulses, whereas their amplitude is dependent upon the position of the phase reversal point p1 or P1', respectively, and thus, also upon the transparency of the feeler transducer 16. By means of the integrator circuit 97 there is formed the electrical direct-current voltage signal shown in the graph 12 of FIG. 9, the amplitude of which always is dependent upon the amplitude of the momentarily prevailing or preceding pulse of the output signal (graph 11) of the divider circuit 90. The formed direct-current voltage signal is visually displayed by means of the display instrument 99. When the direct-current voltage signal has reached a predetermined threshold value, then the relevant threshold switch makes contact, so that the external signal or alarm transmitter, connected at the terminal 100, is placed into operation (graph 13 of FIG. 9).

All of the described embodiments can be modified in that instead of periodically altering the measuring light current it would be possible to periodically vary the reference light current in order to simulate a transparency change of the feeler transducer 16.

Depending upon the field of application of the inventive apparatus the feeler transducer 16 can be differently constructed. A number of constructions of feeler transducer 16 suitable for the practice of the exemplary embodiments have been disclosed in FIGS. 10-13 and will be described hereinafter with reference thereto.

According to FIG. 10 a rod-shaped housing 110 is provided at its central region with a substantially V-shaped recess 111 in the flanks of which there is inserted a respective light pervious body 112 and 113, respectively, having flat parallel surfaces. In a longitudinal bore 114 of the housing 110, bounding the optical body 112, there is located a coupling device 115, constructed in the manner of a packing bushing, for a light guide 116 and a lense body 117 which is optically conductively connected with the light guide 116. A second light guide 118 is guided through a continuous longitudinal bore 119 of the housing 110 to the opposite end thereof and at that location is optically conductively connected by means of a coupling device 120 with a lense body 121. The coupling device 120 and the lense body 121 are located in a further longitudinal bore 122 which bounds the light pervious body 113. Both of the light guides 116 and 118 extend parallel to one another within a protective tube 123 which is threaded with the one end of the housing 110. The other end of the housing 110 carries a threaded protective cover 124 which covers the reverse loop of the light guide 118. The upper end of the protective tube or pipe 123 of the arrangement of FIG. 10 has a (non illustrated) plug connector, by means of which it is possible to mechanically and optically connect the light guides 116 and 118 with further light guides, such as the light guides 15 and 17 of FIG. 1, in a releasable manner, and which further light guides are components of a light guide bundle or light guide cable such as 29 of FIG. 1.

The use and mode of operation of the feeler transducer, shown in the arrangement of FIG. 10, is briefly as follows:

By means of the light guide 116 a measuring light current is infed, which, for instance, is generated by the light source 13 of FIG. 1. This light current leaves the lense body 117 in a parallel focused manner, penetrates through the body 112 and then departs into the atmosphere, and the light beams transversely pass through the substantially V-shaped recess 111 and then impinge at the body 113 when there is only a gaseous medium, for instance typically air, in the recess 111. The light rays then pass through the body 113, are intercepted by the lense body 121 and concentrated in the light guide 118. By means of the latter the light current is infed to an optoelectrical light receiver, such as the light receiver 18 of FIG. 1. Along the described path the measuring light current experiences practically no appreciable damping. If the housing 110 and the closure cover 114 are immersed in a liquid or flooded by a liquid, then the light beam bundle, upon its exit from the body 110, is no longer refracted in the above-described manner towards the body 113, rather it freely exits into the liquid, as indicated by the arrow of FIG. 10, because the difference between the optical refraction coefficients of the body 112 and that of the liquid bounding thereat is appreciably less than the difference between the refractive index of the body 112 and that of a gaseous medium. As a result, practically no light beams are infed any longer to the light guide 118 and the feeler transducer acts as a light barrier. If the housing 110 emerges out of the liquid then the light current can again reach the light guide 118, and the feeler transducer again assumes its original transparency for the measuring light current.

The feeler transducer illustrated and previously described in conjunction with FIG. 10 is particularly suitable for monitoring a maximum permissible liquid level.

On the other hand, FIG. 11 shows a modified construction, especially suitable for monitoring a minimum filling state of a liquid container. The difference in contrast to the embodiment of FIG. 10 only resides in the fact that instead of the bodies 112 and 113 having plane parallel surfaces there are here provided two prismatic light pervious bodies 126 and 127, wherein the inlet and outlet surfaces for the light beams no longer are parallel rather disposed at an angle to one another. The optical index of refraction of the material for both bodies 126 and 127 is as closely equal as possible to the refractive index of the liquid to be monitored. In this way there is achieved the result that upon presence of the liquid in the V-shaped recess 111 the light beam bundle which penetrates the body 126 propagates linearly through the liquid, arrives at the other body 127 and is infed by means of the lense body 121 into the light guide 118. If, on the other hand, the feeler transducer emerges out of the liquid and air or another gaseous medium is in the recess 111 then the light beam bundle, upon its exit out of the body 126, experiences a deflection, as indicated by the arrow of FIG. 11, so that practically no light any longer arrives at the light guide 118 and the feeler transducer appears to be light impervious.

The further embodiment illustrated in FIG. 12 of an optical feeler transducer differs from the previously described embodiments in that the housing 110, instead of having a substantially V-shaped recess 111, has a parallelepiped recess 130 in which there are located bounding the lense bodies 117 and 121 two optical polarization filters 131 and 132 having plane parallel surfaces and therebetween an optically active substance 133. The substance 133 is different depending upon the physical property or magnitude to be monitored, and in any event is capable of rotating the plane of oscillation of the light as a function of the property to be monitored. For the monitoring or measuring of a mechanical pressure there is suitable an elastooptical body, for instance, formed of acrylic glass. For monitoring or measuring a temperature the substance 133 is a liquid crystal. For monitoring or measuring a magnetic field intensity there is used as the substance 133 a magnetooptical crystal, for instance iron garnet, and for the monitoring or measuring of an electrical field intensity an electrooptical crystal, for instance, barium titanate. In all of these cases the mode of operation is such that as a function of the physical property to be monitored or measured there is accomplished a greater or lesser rotation of the plane of oscillation of the light in the substance 113, resulting in a corresponding weakening of the light current flowing to the light guide 118.

The last embodiment shown in FIG. 13 differs from the previously described embodiment in that, instead of two polarization filters 131 and 132, there are only arranged light pervious protective glasses 134 and 135 and therebetween there is provided a free space. With this feeler transducer the transparency of a random substance can be measured, which is introduced between the plates 134 and 135. Equally, it is possible to use this feeler transducer as a light barrier, in order to monitor the presence or absence of opaque or light weakening bodies or to count such bodies when they are moved through the recess 130.

We claim:

1. A method of obtaining and transmitting signals characterizing at least one physical property of a substance which is to be monitored, by means of feeler transducer, light transmitter and light receiver, wherein there is obtained between a measuring light current and a reference light current extending parallel thereto an electrical information signal and the measuring light current and the reference light current are guided through a single light guide bundle, characterized by the features that the measuring light current is guided in timewise alternation to the reference light current at least along part of its transmission paths by means of a common light guide.

2. A method of obtaining and transmitting signals characterizing at least one physical property of a substance which is to be monitored, by means of feeler transducer, light transmitter and light receiver, wherein there is obtained between a measuring light current and a reference light current extending parallel thereto an electrical information signal and the measuring light current and the reference light current are guided through a single light guide bundle, and at least one of both light currents is altered as a function of time, characterized by the features that there is undertaken a temporary change of the one light current by changing the intensity of the light transmitter continuously or in steps until reaching a maximum change and then there is again annihilated the entire accomplished change.

3. The method according to claim 2, characterized by the features that for simulating a certain minimum change of the physical property to be monitored there is undertaken periodically a temporary change of the electrical signal derived from one of both light currents in order to check the transmission path.

4. The method according to claim 3, characterized by the features that the timewise alternation of the measuring light current and the reference light current is undertaken in the common light guide per unit of time more frequently than the periodic, temporary change for simulating a minimum change of the physical property to be monitored.

5. An apparatus for obtaining and transmitting signals characterizing at least one physical property of a substance which is to be monitored, by means of feeler transducer, light transmitter and light receiver, wherein there is obtained from a measuring light current and a reference light current extending parallel thereto an electrical information signal and the measuring light current and the reference light current are transmitted by means of a single light guide bundle, characterized by the features that for producing the measuring light current and the reference light current there are provided separate light transmitters and for receiving both of the light currents at least one light receiver.

6. The apparatus according to claim 5, characterized by the features that both of the light currents are guided along part of their path between the feeler transducer and a common light receiver through a common light guide and that the common light receiver has associated therewith optical or electrical means for the separate detection of both light currents or the electrical signals derived therefrom.

7. The apparatus according to claim 6, characterized by the features that there are provided two light transmitters having different light types and that for the common light receiver there are associated therewith means for differentiating between both light types.

8. The apparatus according to claim 6, characterized by the features that two light transmitters are alternatingly turned-on with respect to one another as a function of time.

9. The apparatus according to claim 6, characterized by the features that both of the light transmitters are modulated with mutually different frequencies.

* * * * *